(12) United States Patent
Lee et al.

(10) Patent No.: US 10,211,903 B1
(45) Date of Patent: Feb. 19, 2019

(54) APPARATUS FOR TRANSMITTING SIMULTANEOUS MULTIPLE BEAMS TO MULTIPLE TARGETS AT NEAR FIELD AND FAR FIELD

(71) Applicant: Hongik University Industry-Academia Cooperation Foundation, Seoul (KR)

(72) Inventors: Jeong-Hae Lee, Seoul (KR); Sun-Gyu Lee, Paju-si (KR); Jae-Gon Lee, Gwangmyeong-si (KR); Chang-Hyun Lee, Incheon (KR); Sang Wook Chi, Incheon (KR)

(73) Assignee: Hongik University Industry-Academia Cooperation Foundation, Seoul (KR)

( * ) Notice: Subject to any disclaimer, the term of this patent is extended or adjusted under 35 U.S.C. 154(b) by 0 days.

(21) Appl. No.: 15/952,239

(22) Filed: Apr. 13, 2018

(30) Foreign Application Priority Data

Jan. 30, 2018 (KR) .................. 10-2018-0011419

(51) Int. Cl.
*H04B 7/06* (2006.01)
*H04W 52/42* (2009.01)

(52) U.S. Cl.
CPC ......... *H04B 7/0682* (2013.01); *H04B 7/0617* (2013.01); *H04W 52/42* (2013.01)

(58) Field of Classification Search
CPC .... H04B 7/0682; H04B 7/0617; H04W 52/42
See application file for complete search history.

(56) References Cited

U.S. PATENT DOCUMENTS

| | | | |
|---|---|---|---|
| 5,721,554 A * | 2/1998 | Hall ...................... | G01S 7/4017 342/165 |
| 9,151,828 B2 * | 10/2015 | Shipley ................. | G01S 7/4052 |
| 2017/0131398 A1 * | 5/2017 | Younis .................. | G01S 13/753 |
| 2018/0090992 A1 * | 3/2018 | Shrivastava ............ | H02J 50/50 |

FOREIGN PATENT DOCUMENTS

KR 10-2016-0104708 A 9/2016

\* cited by examiner

*Primary Examiner* — Freshteh N Aghdam
(74) *Attorney, Agent, or Firm* — Revolution IP, PLLC

(57) ABSTRACT

An apparatus for transmitting simultaneous multiple beams to targets at near and far fields includes: a communication unit consisting of a plurality of unit cells, and configured to communicate a signal or power via antennas provided in each of the unit cells; and a control unit configured to calculate a phase of a voltage applied to the antennas so as to simultaneously transmit the power or signal to the targets at the near and far fields.

9 Claims, 5 Drawing Sheets

[FIG. 1]
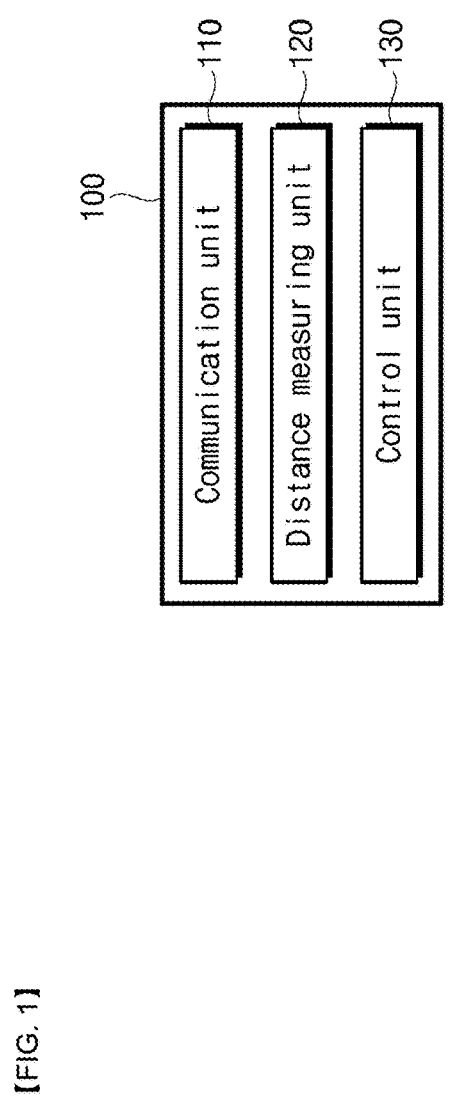
[FIG. 2]
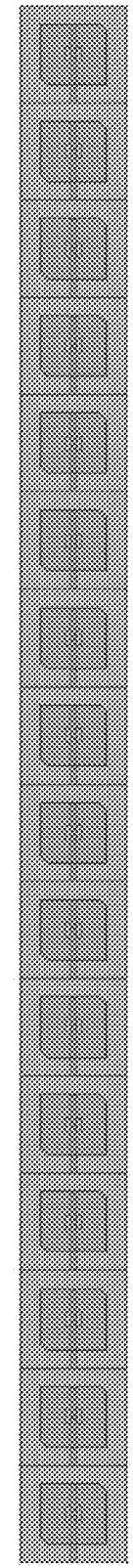

[FIG. 3]
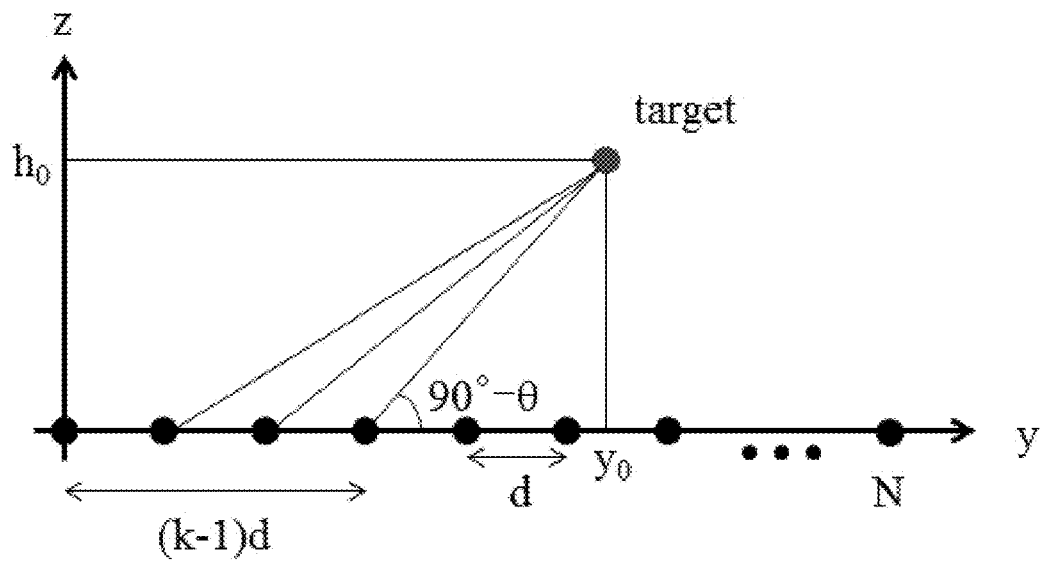
[FIG. 4]
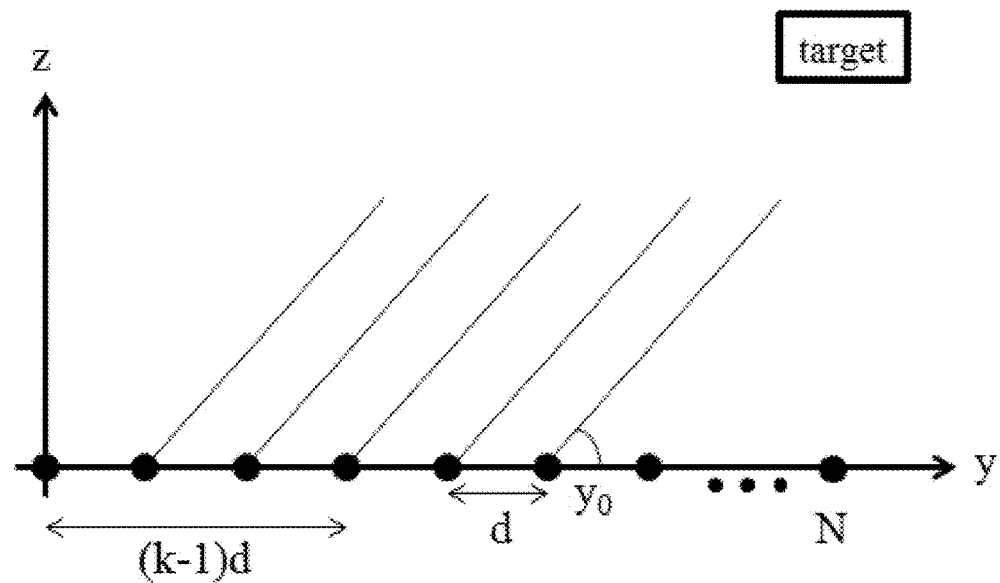

[FIG. 5]
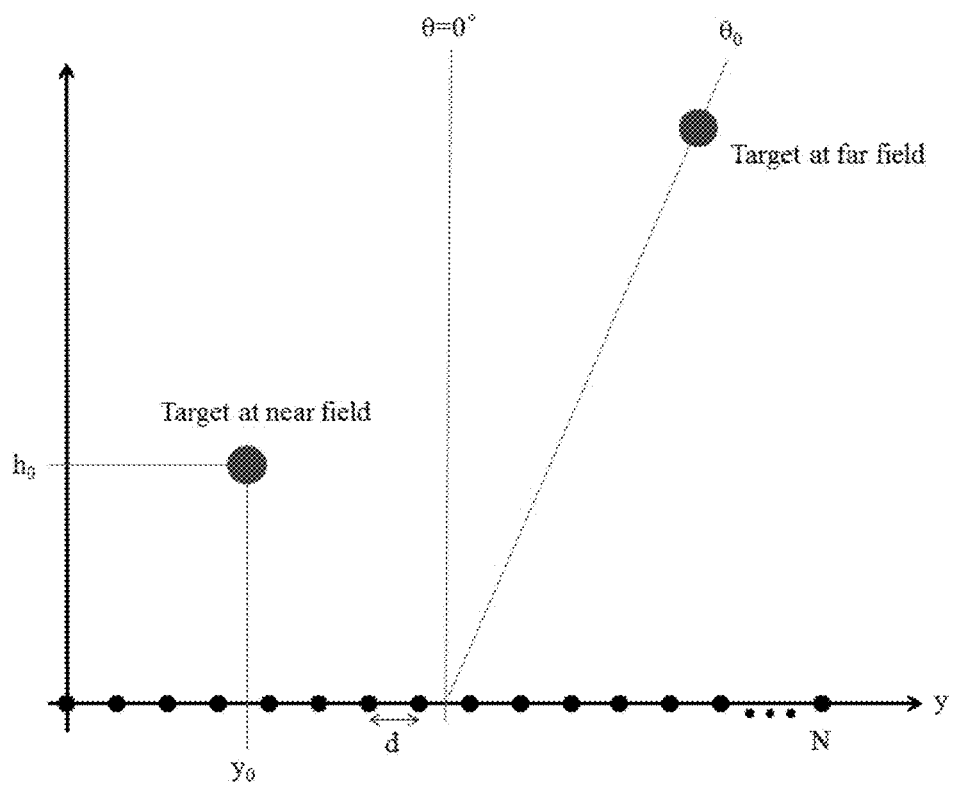

[FIG. 6]
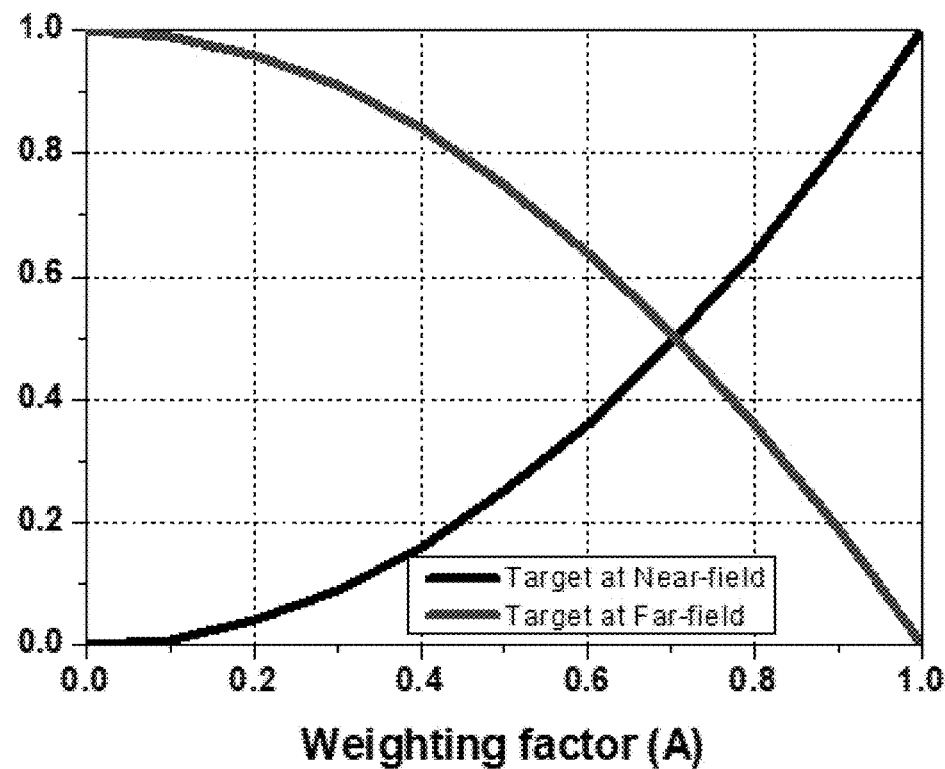
[FIG. 7]
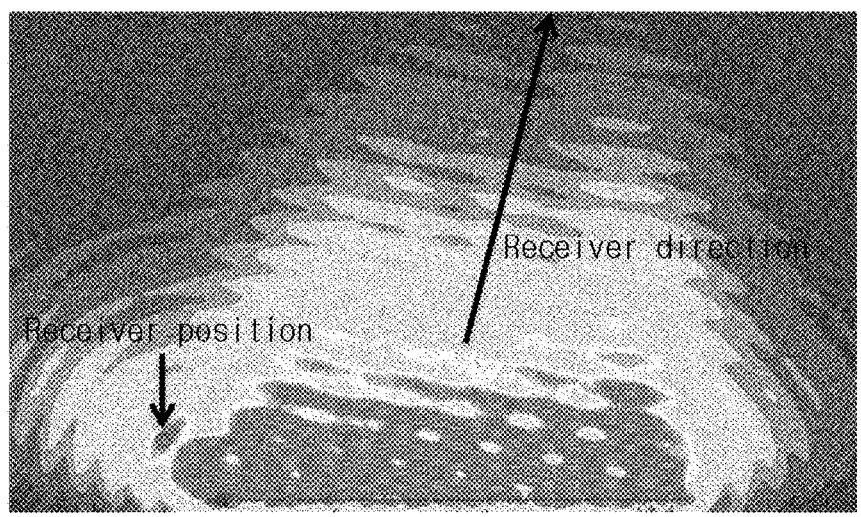

[FIG. 8]
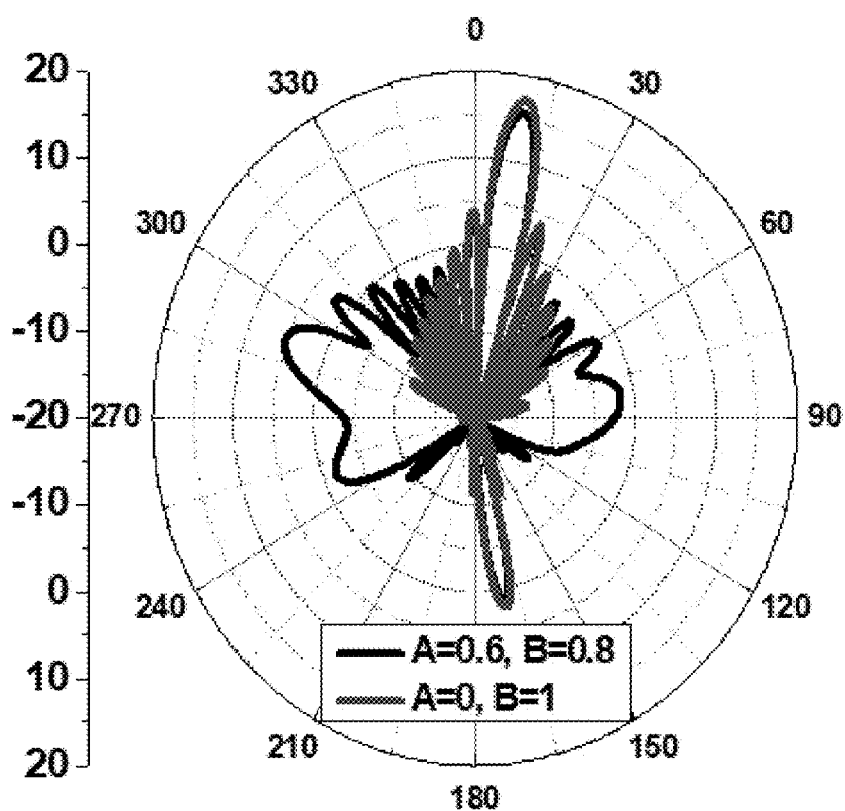

APPARATUS FOR TRANSMITTING SIMULTANEOUS MULTIPLE BEAMS TO MULTIPLE TARGETS AT NEAR FIELD AND FAR FIELD

CROSS-REFERENCE TO RELATED APPLICATION

This application claims priority to and the benefit of Korean Patent Application No. 10-2018-0011419 filed in the Korean Intellectual Property Office on Jan. 30, 2018, the entire contents of which are incorporated herein by reference.

BACKGROUND OF THE INVENTION

(a) Field of the Invention

The present invention relates to an apparatus for transmitting simultaneous multiple beams to multiple targets at near and far fields, and relates to an apparatus for transmitting, using the principle of superposition, simultaneous multiple beams when there are respectively targets at near and far fields.

(b) Description of the Prior Art

Near Field Communication (NFC) has been widely used in industry fields such as logistics, billing, financial and warehouse management, and so on because of its low transmit power, a short communication distance, and high security, but has also a problem that an additional module is required.

In addition, with the development of information and telecommunications technology, a large amount of data is being used based on wireless communication. In a technology such as microwave wireless power transmission or 5G wireless communication, for a higher gain, as an antenna becomes larger, strength of the generated magnetic field has also increased.

As a result, both near-field and far-field regions are simultaneously within an operating range of the antenna.

Accordingly, there is a need for integrating beam focusing techniques, which are separately for the near-field and far-field regions, into a technique of simultaneously focusing beams when there are respectively targets in the near and far field regions.

The background art of the present invention is disclosed in Korean Patent Laid-Open Publication No. 10-2016-104708 (published on 5 Sep. 2016).

SUMMARY OF THE INVENTION

The present invention relates to an apparatus for transmitting simultaneous multiple beams to multiple targets at near and far fields, and has been made in an effort to provide an apparatus for transmitting simultaneous multiple beams using the principle of superposition when there are respectively targets at near and far fields.

According to an exemplary embodiment of the present invention for achieve these technical objects, an apparatus for transmitting simultaneous multiple beams to targets at near and far fields is provided, the apparatus comprising: a communication unit consisting of a plurality of unit cells, and configured to communicate a signal or power via antennas provided in each of the unit cells; and a control unit configured to calculate a phase of a voltage applied to the antennas so as to simultaneously transmit the power or signal to the targets at the near and far fields.

The apparatus may include a distance measuring unit for measuring a distance to the target by using at least one of a BLE module, a Lytro Camera module, a beacon module, and an optical camera module.

The control unit may be configured to determine that the target is in the far field if the distance to the target is greater than the following reference distance D, and determine that the target is in the near field if the distance to the target is smaller than the reference distance D:

$$D = \frac{2d^2}{\lambda}$$

wherein, d is a distance between centers of the adjacent antennas, and $\lambda$ represents a wavelength of the antenna.

When the targets at near and far fields simultaneously exist, the control unit may be configured to calculate a voltage applied to the communication unit by using the following equation:

$$V_k \angle \phi_k = A \angle \left( \frac{1}{\sqrt{(\beta h_0)^2 + (\beta y_0 - \beta(k-1)d)^2}} + \phi_A \right) + B \angle (-(k+1)\beta d \sin \theta + \phi_B)$$

wherein, A and B are respectively weight values for the targets at the near and far fields, $\phi_A$ and $\phi_B$ are respectively reference phases for the targets at the near and far fields, $\beta$ is a propagation coefficient in the air, $h_0, y_0$ represents a location of the target, d represents a distance between the antennas, and $\theta$ represents a beamforming angle from the unit cell to the target.

When only the target at the near field exists, the control unit may be configured to calculate a phase of the voltage applied to the communication unit by using the following equation:

$$\phi_k = \sqrt{(\beta h_0)^2 + (\beta y_0 - \beta(k-1)d)^2}$$

When only the target at the far field exists, the control unit may be configured to calculate a phase of the voltage applied to the communication unit by using the following equation:

$$\phi_k = -(k-1)\beta d \sin \theta$$

The weight values may satisfy a relationship that a sum of $A^2$ and $B^2$ is equal to 1.

The unit cells may be formed of a meta material and provided at a predetermined interval.

According to the present invention as described above, when there are simultaneously targets at near and far fields, beams are simultaneously focused using the principle of superposition, thereby contributing to constructing an efficient antenna system.

In addition, when one of the targets at the near or far field is selected to focus the beam, efficiency of the communication can be improved.

BRIEF DESCRIPTION OF THE DRAWINGS

FIG. 1 is a schematic diagram of an apparatus according to an exemplary embodiment of the present invention.

FIG. 2 shows a plurality of unit cells according to an exemplary embodiment of the present invention.

FIG. 3 shows focusing beams in a near field in a microwave manner.

FIG. 4 shows focusing beams in a far field in a microwave manner.

FIG. 5 shows focusing beams in a microwave manner when targets at near and far fields simultaneously exist.

FIG. 6 shows power received by targets at near and far fields according to a weight value.

FIG. 7 shows a result of electric field distribution in which near and far fields according to an exemplary embodiment of the present invention are simultaneously focused.

FIG. 8 shows results of a radiation pattern in which near and far fields according to an exemplary embodiment of the present invention are simultaneously focused and a radiation pattern in which only a far field is focused.

DETAILED DESCRIPTION OF THE EMBODIMENTS

Hereinafter, embodiments of the present invention will be described in detail with reference to the accompanying drawings so that those skilled in the art can easily carry out the present invention. As those skilled in the art would realize, the described embodiments may be modified in various different ways, all without departing from the spirit or scope of the present invention. In order to clearly illustrate the present invention, parts not related to the description are omitted, and like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

Embodiments of the present invention will now be described in detail with reference to the accompanying drawings so that those skilled in the art can easily carry out the present invention.

FIG. 1 is a schematic diagram of an apparatus according to an exemplary embodiment of the present invention.

As shown in FIG. 1, an apparatus 100 according to an exemplary embodiment of the present invention includes a communication unit 110, a distance measuring unit 120, and a control unit 130.

First, the communication unit 110 consists of a plurality of unit cells, and transmits and receives a signal or power via antennas provided in each of the unit cells.

In addition, the antenna may be formed of a meta material. The meta material refers to a material that is made from a periodic arrangement of meta atoms, which is designed as a metal or a dielectric material engineered to have a size much smaller than the wavelengths of light so as to realize a property that is not found in nature.

FIG. 2 shows a plurality of unit cells according to an exemplary embodiment of the present invention.

As shown in FIG. 2, the plurality of unit cells may be arranged in series, and particularly, depending on the geometric shape and fixability of the unit cells, the kinds of antennas formed by the unit cells are implemented in various ways as a linear array antenna, a planar array antenna, and the like.

In FIG. 2, a distance between the respective unit cells is uniformly 0.5$^\lambda$, and the distance between unit cells can be changed depending on the configuration and kind of the antenna.

Next, the distance measuring unit 120 may include at least one of a beacon module, a BLE (Bluetooth Low Energy) module, a Lytro Camera module and an optical camera module, and uses the module to measure a distance to the target.

The beacon module uses a short-range communication technology of a smart phone that enables message transmission, mobile payment, etc. by locating a user within a radius of 50 to 70 m via the BLE module, and in particular, has an advantage of enabling more precise indoor positioning.

The BLE (Bluetooth Low Energy) module is a low-power Bluetooth module that supports low power wireless communication by solving the problem of excessive battery consumption, which is one of disadvantages of the existing Bluetooth, and is used in most of the recently released wearable devices such as a smart band, smart glasses, and so on.

The optical camera module is a module that is used together with a deep learning technology and extracts several images so as to determine the location of an object by using the deep learning technology.

The Lytro Camera module refers to a camera module that, after taking a picture, allows an editor to move a focus of the photographed image to where he or she desires.

Next, using a reference distance D, the control unit 130 determines whether a region in which the target is belongs to a near or far field.

In this case, the reference distance D is expressed by the following Equation 1.

$$D = \frac{2d^2}{\lambda} \qquad \text{(Equation 1)}$$

In Equation 1, d is a distance between centers of the adjacent antennas, and $\lambda$ represents a wavelength of the antenna.

FIG. 3 shows focusing beams in a near field in a microwave manner.

As shown in FIG. 3, when a distance of a target measured by the distance measuring unit 120 is smaller than a reference distance D obtained from Equation 1, the control unit 130 determines that the target is in a near field, and controls each communication unit 110 to apply a voltage having a phase as shown in the following Equation 2.

$$\phi_k = \sqrt{(\beta h_0)^2 + (\beta y_0 - \beta(k-1)d)^2} \qquad \text{(Equation 2)}$$

In Equation 2, $\beta$ is a propagation coefficient in the air, d is a distance between the respective unit cells, $h_0, y_0$ represents a location of the target at the near field, and k is a constant that denotes a location of the unit cell.

FIG. 4 shows focusing beams in a far field in a microwave manner.

As shown in FIG. 4, when a distance of a target measured by the distance measuring unit 120 is greater than a reference distance D, the control unit 130 determines that the target is in a far field, and controls each communication unit 110 to apply a voltage having the phase as shown in the following Equation 3.

$$\phi_k = -(k-1)\beta d \sin\theta \qquad \text{(Equation 3)}$$

In Equation 3, $\theta$ represents a beamforming angle from the unit cell to the target.

Hereinafter, a process of obtaining a voltage applied to the communication unit when targets at near and far fields simultaneously exist will be described.

FIG. 5 shows focusing beams in a microwave manner when targets at near and far fields simultaneously exist.

If the control unit 130 determines that targets at the near and far fields respectively exist, the control unit 130 applies a voltage as shown in the following Equation 4 to the antenna of the communication unit 110.

$$V_k \angle \phi_k = A \angle (\beta h_0)^2 + (\beta y_0 - \beta(k-1)d)^2 + \phi_A) + B \angle (-(k-1)\beta d \sin\theta + \phi_B)$$ (Equation 4)

In Equation 4, A and B are respectively weight values for the targets at the near and far fields, and $\phi_A$ and $\phi_B$ respectively represent reference phases for the targets at the near and far fields.

In particular, the weight value A and the weight value B are values that satisfies the following Equation 5.

$$A^2 + B^2 = 1$$ (Equation 5)

FIG. 6 shows power received by targets at near and far fields according to a weight value.

In FIG. 6, an x-axis represents a magnitude of the weight A, and the black graph represents a change in the power received by the target at the near field as A changes, and the red graph represents a change in the power received by the target at the far field.

FIG. 7 shows a result of electric field distribution in which near and far fields according to an exemplary embodiment of the present invention are simultaneously focused.

That is, FIG. 7 shows an experiment result that, when targets at the near and far fields simultaneously exist, if the voltage as shown in Equation 4 is excited to the communication unit 110 according to the current exemplary embodiment of the present invention, checks to see if the power is transmitted correctly to the targets at the near and far fields.

In this experiment, the control unit 130 is allowed to excite the voltage as shown in Equation 4 to the communication unit 110, with a target in the far field positioned at $\theta=10°$ and a target in the near field respectively positioned at points $-\lambda_0$ and $\lambda_0$.

In this case, the weights A and B are respectively set to 0.6 and 0.8.

In particular, it is set such that in FIG. 7, more power is transmitted to a region indicated in red, and the power is transmitted in a direction perpendicular to the electric field distribution.

Thus, as shown in FIG. 7, it can be seen that high power is correctly transmitted to the target at the near field (indicated by "receiver position" in FIG. 7).

As shown in FIG. 7, it can also be seen that high power is correctly transmitted to the target at the far field (indicated by "receiver direction" in FIG. 7).

As shown in FIG. 7, it can be seen that radio waves are concentrated into the target (receiver) at the near field, and in particular, the radio waves are concentrated toward the target (receiver) at the far field from the antenna.

FIG. 8 shows results of a radiation pattern in which near and far fields according to an exemplary embodiment of the present invention are simultaneously focused and a radiation pattern in which only a far field is focused.

Particularly, FIG. 8 shows the result of the radiation pattern obtained by changing the weights in the experiment related to FIG. 7, and is the result for the target at the far field.

That is, the black graph is an experimental result of the radiation pattern when the weights A and B are respectively set to 0.6 and 0.8, and the red graph shows an experimental result of the radiation pattern when the weights A and B are respectively set to 0 and 1.

In this case, the result shows that the voltage transmitted to the target at the far field is 15.67 dBic for the black graph and 17.06 dBic for the red graph.

That is, it can be seen that, even if the weights A and B are changed, the magnitude and direction of the voltage transmitted to the target at the far field is maintained.

In addition, the power can be transmitted while appropriately changing the magnitudes of the weights A and B according to the location of the target and the surrounding communication environment.

As described above, according to the present invention, when targets at near and far fields simultaneously exist, it is possible to focus beams simultaneously using the principle of superposition, thereby contributing to constructing an efficient antenna system.

Further, when one of the targets at the near or far field is selected to focus the beam, communication efficiency can be improved.

DESCRIPTION OF SYMBOLS

100: transmitting apparatus
110: communication unit
120: distance measuring unit
130: control unit

What is claimed is:

1. An apparatus for transmitting simultaneous multiple beams to targets at near and far fields, comprising:
   one or more computer-executable units being configured and executed by a processor using algorithm associated with at least one non-transitory storage device, the algorithm, when executed, causing the processor to execute the computer-executable units, the units comprising,
   a communication unit consisting of a plurality of unit cells, and configured to communicate a signal or power via antennas provided in each unit cell;
   a distance measuring unit configured to measure distances to the targets by using at least one of a Bluetooth Low Energy (BLE) module, a Lytro Camera module, a beacon module, and an optical camera module; and
   a control unit configured to calculate a phase of a voltage applied to the antennas in response to receipt of the distances so as to simultaneously transmit the power or signal to the targets at the near and far fields.

2. The apparatus of claim 1, wherein
   the control unit is configured to:
   determine that a target is in the far field if a distance to the target is greater than a following reference distance D, and determine that the target is in the near field if the distance to the target is smaller than the reference distance D:

$$D = \frac{2d^2}{\lambda}$$

wherein, d is a distance between centers of the adjacent antennas, and λ represents a wavelength of an antenna.

3. The apparatus of claim 2, wherein
   the control unit is configured to:
   when the targets at the near and far fields simultaneously exist,
   calculate the voltage applied to the antennas by using the following equation:

$$V_k \angle \phi_k = A \angle (\sqrt{(\beta h_0)^2 + (\beta y_0 - \beta(k-1)d)^2} + \phi_A) + B \angle (-(k-1)\beta d \sin\theta + \phi_B)$$

wherein, A and B are respectively weight values for the targets at the near and far fields, $\phi_A$ and $\phi_B$ are respectively reference phases for the targets at the near and far fields, $\beta$ is a propagation coefficient in the air, $h_0$ and $y_0$ represent locations of the targets, k is a constant that denotes a location of the unit cell, and $\theta$ represents a beamforming angle from the unit cell to the target.

4. The apparatus of claim 2, wherein
the control unit is configured to:
when only the target at the near field exists, calculate the phase of the voltage applied to the antennas by using the following equation:

$$\phi_k = \sqrt{(\beta h_0)^2 + (\beta y_0 - \beta(k-1)d)^2}$$

wherein, $\beta$ is a propagation coefficient in the air, $h_0$ and $y_0$ represent locations of the targets, and k is a constant that denotes a location of the unit cell.

5. The apparatus of claim 2, wherein
the control unit is configured to:
when only the target at the far field exist, calculate the phase of the voltage applied to the antennas by using the following equation:

$$\phi_k = -(k-1)\beta d \sin\theta$$

wherein, $\beta$ is a propagation coefficient in the air, $\theta$ represents a beamforming angle from the unit cell to the target, and k is a constant that denotes a location of the unit cell.

6. The apparatus of claim 3, wherein
the weight values satisfy a relationship that a sum of $A^2$ and $B^2$ is equal to 1.

7. The apparatus of claim 1, wherein
the unit cells are formed of a meta material and provided at a predetermined interval.

8. The apparatus of claim 4, wherein
the weight values satisfy a relationship that a sum of $A^2$ and $B^2$ is equal to 1.

9. The apparatus of claim 5, wherein
the weight values satisfy a relationship that a sum of $A^2$ and $B^2$ is equal to 1.

\* \* \* \* \*